United States Patent

[11] 3,608,022

| [72] | Inventor | Alan G. Wallskog |
| | | Prospect Heights, Ill. |
| [21] | Appl. No. | 754,426 |
| [22] | Filed | Aug. 21, 1968 |
| [45] | Patented | Sept. 21, 1971 |
| [73] | Assignee | Teletype Corporation |
| | | Skokie, Ill. |

[54] METHOD OF MOLDING ZERO DRAFT OBJECTS
1 Claim, 3 Drawing Figs.

[52] U.S. Cl. .................................................. 264/102,
18/2 RP, 264/138, 264/272, 264/278, 264/334
[51] Int. Cl. ............................................... B29c 7/00,
B29d 3/00
[50] Field of Search .......................................... 264/334,
278, 279, 255, 272, 102; 249/63; 18/2 RM, 2 RP;
25/120

[56] References Cited
UNITED STATES PATENTS

| 1,731,240 | 10/1929 | Apfelbaum | 264/334 X |
| 3,095,611 | 7/1963 | Borah | 264/277 |
| 3,364,567 | 1/1968 | Brown | 264/255 |
| 3,060,509 | 10/1962 | McCubbins | 18/2 RP X |
| 1,845,116 | 2/1932 | Apple | 264/279 X |
| 2,540,932 | 2/1951 | Clark | 264/279 X |
| 1,641,923 | 9/1927 | Davis | 18/2 RM |
| 3,499,066 | 3/1970 | Murray | 264/278 X |

FOREIGN PATENTS

| 79,866 | 12/1950 | Czechoslovakia | 25/120 |

Primary Examiner—Robert F. White
Assistant Examiner—Allen M. Sokal
Attorneys—J. L. Landis and R. P. Miller ABSTRACT: A method of making voice coils having no mold release taper comprising pouring a casting resin into a mold including a nontapered outer member and a nontapered inner member, dropping a preformed coil of conductive material through the resin, curing the resin, forcing the inner member out the bottom of the coil and forcing the coil out the top of the outer member.

PATENTED SEP 21 1971　　　　　　　　　　　3,608,022

INVENTOR
ALAN G. WALLSKOG

BY Michael A. O'Neil
ATTORNEY

METHOD OF MOLDING ZERO DRAFT OBJECTS

BACKGROUND OF THE INVENTION

Objects designed for fabrication by molding or similar operations are almost universally provided with a slight taper, known in the art as "draft," which serves to release a finished object from its mold upon a small amount of relative movement between them. The design of some objects, however, does not permit any taper whatsoever and, accordingly, such objects heretofore either have been fabricated by processes other than molding or have been machined after the molding operation.

SUMMARY OF THE INVENTION

In the preferred embodiment a method of forming objects having no draft whatsoever includes the steps of forming an object in a mold assembly including inner and outer mold components having molding surfaces extending parallel to each other, forcing the inner mold component out one end of the mold assembly and forcing the object out the other end.

DESCRIPTION OF THE DRAWING

A more complete understanding of the invention may be had by referring to the following detailed description when taken in conjunction with the drawing wherein.

DETAILED DESCRIPTION

Figure 1:
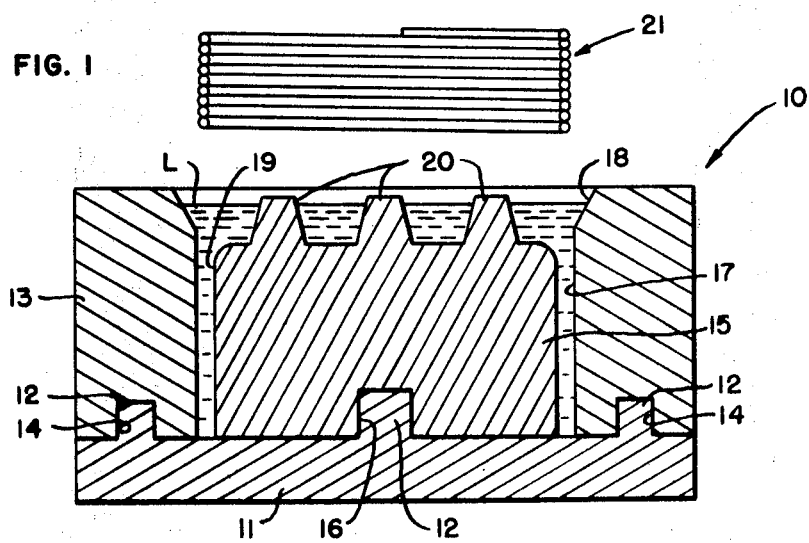
FIG. 1 is a sectional view of a mold assembly incorporating the present invention which illustrates the method of the present invention at a first stage.

Referring now to the drawing, wherein like reference numerals designate like parts throughout the several views, and referring particularly to FIG. 1 thereof, there is shown a mold assembly 10 including a bottom plate 11 having a plurality of locating pins 12 extending upwardly from it. An outer mold component 13 having a plurality of apertures 14 formed in it is positioned on the bottom plate 11 with a locating pin 12 positioned within each aperture 14. An inner mold component 15 having a plurality of apertures 16 formed in it (only one of which is shown) is also positioned on the bottom plate 11 with a locating pin 12 extending into each aperture 16.

The outer mold component 13 is provided with an interior molding wall 17 which extends vertically upwardly from the bottom plate 11 and is also provided with a supporting edge forming wall 18 which slants outwardly from the interior molding wall 17 away from the inner mold component 15. The interior wall 17 of the outer mold component 13 is circular in configuration and forms a right circular cylinder around an axis extending through the center of the outer mold component 13.

The inner mold component 15 is provided with an exterior molding wall 19 which extends vertically upwardly from the bottom plate 11 and is also provided with a plurality of extracting pins 20 which extend upwardly from the component 15.

The mold assembly 10 is manufactured in such a way that the wall 19 is positioned a predetermined distance away from the wall 17 around its entire periphery and extends parallel with respect thereto as closely as possible. Thus, like the wall 17, the wall 19 forms a right circular cylinder positioned around an axis extending through the center of the outer mold component 13.

In use, the mold assembly 10 is assembled into the configuration shown in FIG. 1 and the interior molding wall 17 and the exterior molding wall 19 of the mold components 13 and 15, respectively, are coated with a mold release compound such as the compound sold by Hysol Corporation of Olean, New York and identified by that company as 0 AC5259. A quantity of a liquid casting material, such as air cure epoxy resin or the like is poured into the cavity between the interior molding wall 17 and the exterior molding wall 19 until the mold assembly 10 is filled to a point just below the tops of the extracting pins 20 formed on the inner mold component 15. At this point the liquid casting material L engages the wall 18.

A preferred coil of conductive wire 21 is dropped into the cavity between the walls 17 and 19 and is either allowed to sink downwardly toward the bottom wall 11 under the action of gravity or is gently pushed toward the bottom plate 11. During this operation the liquid casting material L in the mold assembly 10 flows around both sides of the preformed coil 21 and thereby centers the coil 21 between the walls 17 and 19. The coil 21 may be of any desired type but is preferably formed from a length of adhesive coated wire by winding the wire around a right circular cylinder to form a helix and then spraying the helix with a solvent which actuates the adhesive and thereby bonds each turn of the helix to an adjacent turn.

Figure 2:
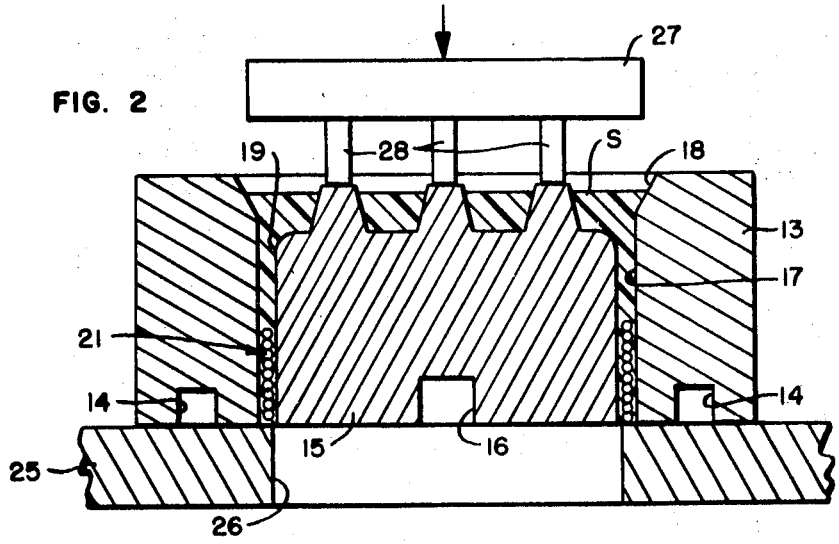
FIG. 2 is a view similar to FIG. 1 which illustrates the method at a later stage.
Figure 3:
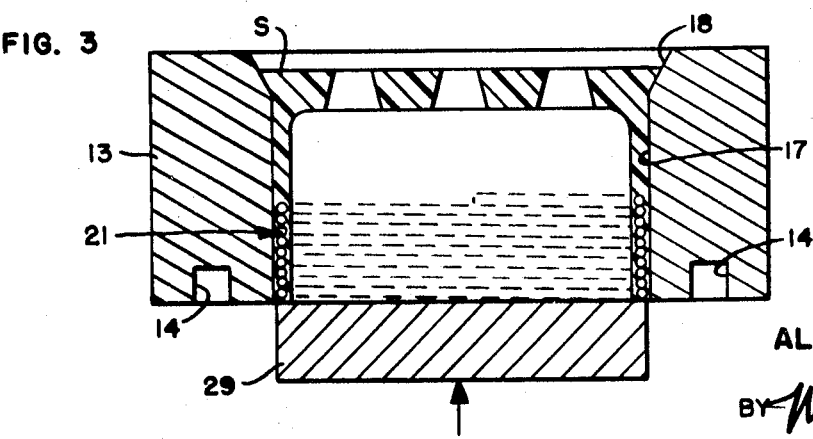
FIG. 3 is a view similar to FIG. 2 which illustrates the method at a still later stage.

When the preformed coil 21 is in position in the bottom of the cavity between the inner mold component 15 and the outer mold component 13 the mold assembly 10 is degassed and the liquid casting material L in the mold assembly 10 is allowed to cure for a length of time sufficient to solidify the liquid material into a solid body S. The bottom plate 11 is then removed from the mold assembly 10 and, as is shown in FIG. 2, the outer mold component 13 and the solid body of epoxy S within the mold assembly 10 is positioned on a supporting plate 25 having an aperture 26 formed in it. The aperture 26 has a configuration identical to and is substantially the same size as the exterior molding wall 19 of the inner mold component 15. A striker plate 27 having a plurality of fingers 28 extending downwardly from it is placed on the inner mold component 15 with the fingers 28 in engagement with the extracting pins 20 thereof. The striker plate 27 is forced toward the bottom plate 11, thereby driving the inner mold component 15 downwardly with respect to the outer mold component 13. This action is continued until the inner mold component is completely free of the solid body of epoxy S positioned within the mold assembly 10. During the removal of the inner mold component 15 the portion of the solid body of epoxy S engaged with the surface 18 of the outer mold component 13 aids the supporting plate 25 in retaining the solid body of epoxy S within the mold assembly 10.

After the inner mold component 15 is removed from the mold assembly 10 the supporting plate 25 is removed and a coil removal plate 29 having a configuration identical to and having a diameter substantially the same as the interior molding wall 17 is engaged with the bottom of the solid body of epoxy S and is driven upwardly, thereby driving the solid body of epoxy S out of the mold in a direction opposite to the direction of removal of the inner mold component 15 from the mold assembly 10. The portion of the solid body of epoxy S extending beyond the uppermost turn of the coil 21 may then be removed by any convenient machining operation if desired.

Although only one embodiment of a method of and apparatus for molding zero draft objects is shown in the drawings and described in the foregoing specification it will be understood that the invention is not limited to the specific embodiment shown but is capable of modification, rearrangement and substitution of parts and elements without department from the scope of the invention.

I claim:

1. In a method of embedding a coil in the wall of a cup-shaped shell;

placing one end of a right cylindrical mold member on a base, said mold member having means projecting from the top end;

placing an annular mold member on the base, said annular mold member having an internal wall in the configuration of right cylinder which is positioned coaxially of the axis of the right cylindrical mold member to define a space between the exterior cylindrical wall of the right cylindrical member and the interior right cylindrical wall of the annular member, said annular member having an interior outwardly slanting surface communicating with said interior wall and extending above the top end surface of said right cylindrical mold;

flowing curable liquid casting material into said space between the mold members to immerse a portion of the slanting surface on the annular mold member, and the top of the right cylindrical mold member, leaving the top of the projecting means exposed;

moving a coil into said space to displace the casting material on both sides of the coil and thus reacting the casting material against the coil to center the coil within the space;

degassing the casting material;

curing the casting material to form a shell embedding the coil;

applying force to the projecting means to move the right cylindrical mold from within the shell and leaving the shell suspended on the slanting surface; and then applying force to the bottom annular surface of the shell to move the shell from within the annular mold member and away from the slanting surface.